United States Patent
Oh

(10) Patent No.: US 6,195,386 B1
(45) Date of Patent: Feb. 27, 2001

(54) PARALLEL DECISION FEEDBACK EQUALIZER

(75) Inventor: Stephen S. Oh, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/085,530

(22) Filed: May 27, 1998

Related U.S. Application Data

(63) Continuation of application No. 08/879,686, filed on Jun. 24, 1997, now abandoned, which is a continuation of application No. 08/312,339, filed on Sep. 26, 1994, now abandoned.

(51) Int. Cl.[7] .............................. H03K 5/159; H03H 7/30; H03H 7/40
(52) U.S. Cl. ................................................ 375/233
(58) Field of Search ................................... 375/229, 230, 375/331, 232, 233, 234, 235; 708/300, 319, 322, 323; 341/106

(56) References Cited

U.S. PATENT DOCUMENTS

| | | | |
|---|---|---|---|
| 5,008,668 | * | 4/1991 | Takayama et al. . |
| 5,619,535 | * | 4/1997 | Alvarez, Jr. .......................... 375/308 |
| 5,640,423 | * | 6/1997 | Archer ................................. 375/261 |
| 5,872,817 | * | 2/1999 | Wei ..................................... 375/341 |

OTHER PUBLICATIONS

Oh et al. Implementation of a parallel DFE using residue number system, IEEE, pp. III–237 through III–240, 1994.*

* cited by examiner

*Primary Examiner*—Chi H. Pham
*Assistant Examiner*—Jean B. Corrielus
(74) *Attorney, Agent, or Firm*—Wade James Brady, III; Frederick J. Telecky, Jr.

(57) ABSTRACT

A parallel decision feedback equalizer (10) using residue number system (RNS) is provided. The binary input data (12, 22) is converted to the residue number system, in particular the quadratic residue number system for digital video systems, prior to filtering by a plurality of parallel adaptive filters (26). The filtered data is then converted back to the binary system by a converter (18, 34) prior to the decision making operation by a slicer (36). The output from the slicer (36) is also provided as a feedback in the residue number system to be summed with the output from the parallel adaptive filters (26). When the DFE implementation for a system requires a wide input data width and high sampling rates, the parallel decision feedback equalizer (10) provides a speed advantage over conventional approaches.

9 Claims, 2 Drawing Sheets

PARALLEL DECISION FEEDBACK EQUALIZER

CROSS REFERENCE TO PRIOR APPLICATIONS

This application is a continuation of Ser. No. 08/879,686, filed Jun. 24, 1997 now abandoned, which is a continuation of Ser. No. 08/312,339, filed Sep. 26, 1994 now abandoned.

TECHNICAL FIELD OF THE INVENTION

This invention relates in general to the field of digital signal processing circuits and systems. More particularly, the present invention relates to a parallel decision feedback equalizer.

BACKGROUND OF THE INVENTION

With the imminent introduction of digital television and high definition television (HDTV), the signal processing requirements of digital video delivery systems have recently received much attention. The current trend in the industry is to digitize the analog signal as soon as possible at a low rate and process the signal digitally. Digital signal processing algorithms such as adaptive filtering and equalization are critical for such systems and have long been used in telephone modem applications. However, the bit rate requirement for compressed video data is an order of magnitude greater than that for telephone modems.

For a HDTV system, the symbol rate at the receiver is approximately 6 MHz. An adaptive equalizer, used to reduce the intersymbol interference of the incoming signal, requires approximately a 100-tap filter for the equalizer. Even when using the simplest Least Mean Square (LMS) algorithm for updating the filter coefficients at every sample, the computational requirements are beyond the capabilities of any programmable digital signal processor in the market today. The complexity of the LMS algorithm is known to be 3N where N is number of taps. Therefore, if the coefficients of the equalizer is to be updated at every sample, the required processing power would be approximately $3N*6.0\times10^6$, i.e., 1,800 Million for N=100, instructions per second.

The conventional approach to resolve this problem is to assume that the channel characteristics are changing much slower than the symbol rate. This assumption permits filter coefficient updates at a much slower rate. The resulting system architecture consists of dedicated hardware for the filter section and a programmable digital signal processor (DSP) for error computation and new coefficient generation. Current application specific integrated circuit (ASIC) technology enables us to develop dedicated filter chips for the equalizer which can operate at high input sample rates. However, depending on the application, a conventional custom chip cannot provide an adequate level of performance when both a wide input data width, e.g. greater than 16 bits and high sample rates are required.

To overcome this limitation, various approaches have been proposed to parallelize the equalizer structure. Previously, parallelization of the decision feedback equalizer has been developed based on block updates using an extended LMS algorithm for filter update. In this scheme, the input data samples are broken into multiple blocks with the same number of samples each. They are then processed by multiple decision feedback equalizers in parallel. Also, another parallel scheme uses a double-row decision feedback equalizer algorithm. These schemes have the disadvantage of requiring more hardware and are not suited to applications where fast coefficient updates are required.

Accordingly, a need has arisen for a decision feedback equalizer which can accommodate a wide input data width and high sampling rates, and does not involve more complex hardware.

SUMMARY OF THE INVENTION

In accordance with the present invention, a parallel decision feedback equalizer is provided which eliminates or substantially reduces the disadvantages associated with prior systems.

In one aspect of the invention, a parallel decision feedback equalizer using residue number system (RNS) is provided. The binary input data is converted to the residue number system, in particular the quadratic residue number system for digital video systems, prior to filtering by a plurality of parallel adaptive filters. The filtered data is then converted back to the binary system by a converter prior to the decision making operation by a slicer. The output from the slicer is also provided as a feedback in the residue number system to be summed with the output from the parallel adaptive filters.

In another aspect of the invention, a method for performing decision feedback equalization is provided. The input binary data is first converted to the residue number system, and the converted data is then provided to the decision feedback equalizer which includes a number of adaptive filters in parallel. The filtered data is converted back to binary data before supplying it to a slicer. The output of the slicer is also fed back to be converted to the residue number system, adaptive filtered, and combined with the output of the adaptive filters in the forward direction.

The parallel decision feedback equalizer in accordance with the present invention results in less hardware and faster data processing even for large data widths and fast symbol rates.

BRIEF DESCRIPTION OF THE DRAWINGS

For a better understanding of the present invention, reference may be made to the accompanying drawings, in which.

DETAILED DESCRIPTION OF THE INVENTION

Figure 1:
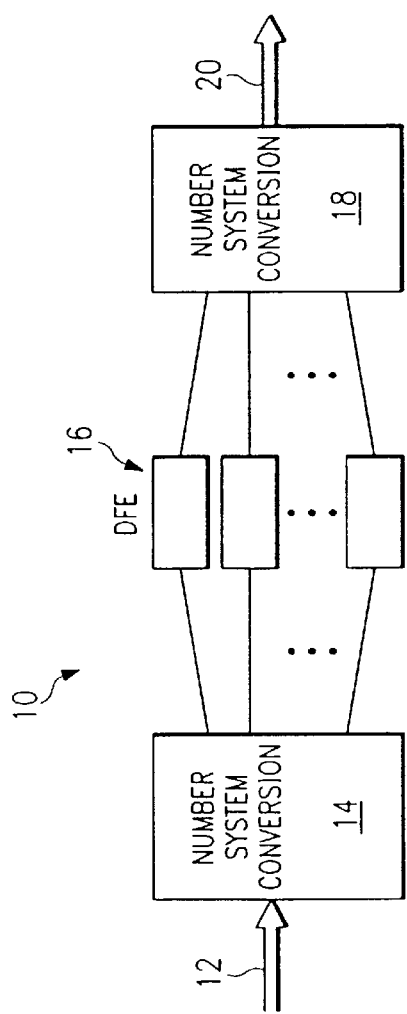
FIG. 1 is a simplified top level block diagram of an embodiment of the decision feedback equalizer of the present invention.
Figure 2:
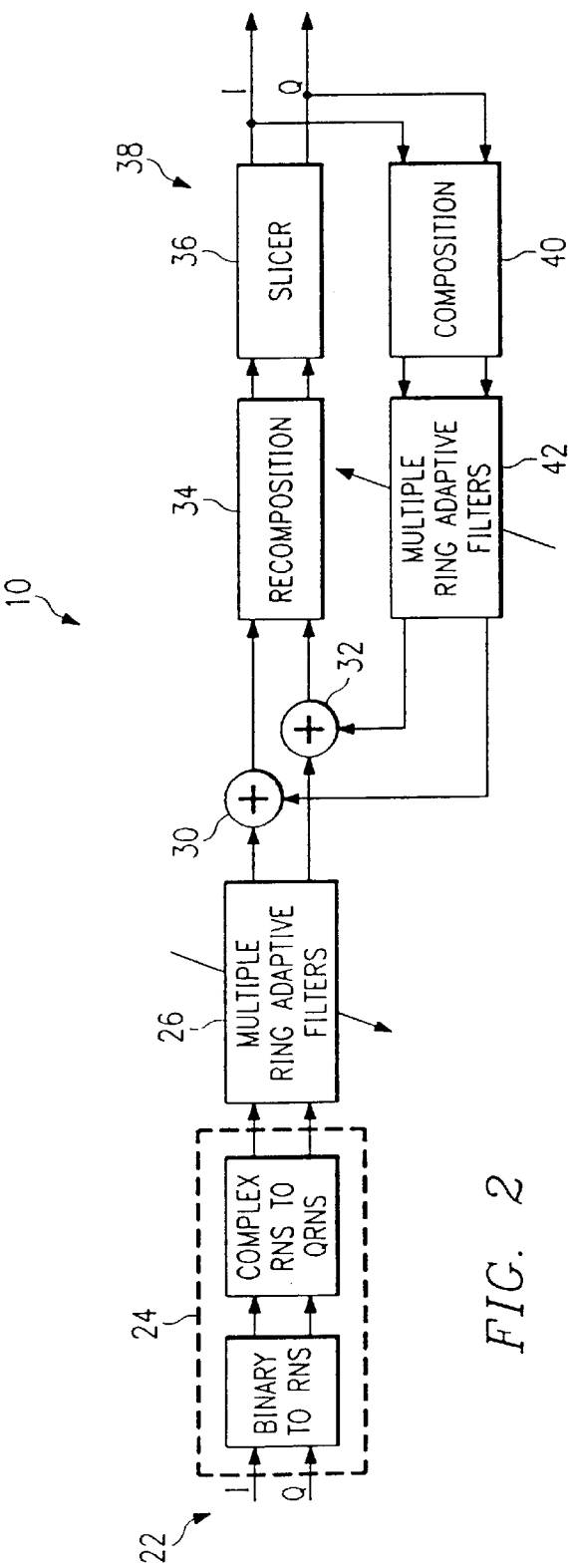
FIG. 2 is a simplified block diagram of an embodiment of the decision feedback equalizer.
Figure 3:
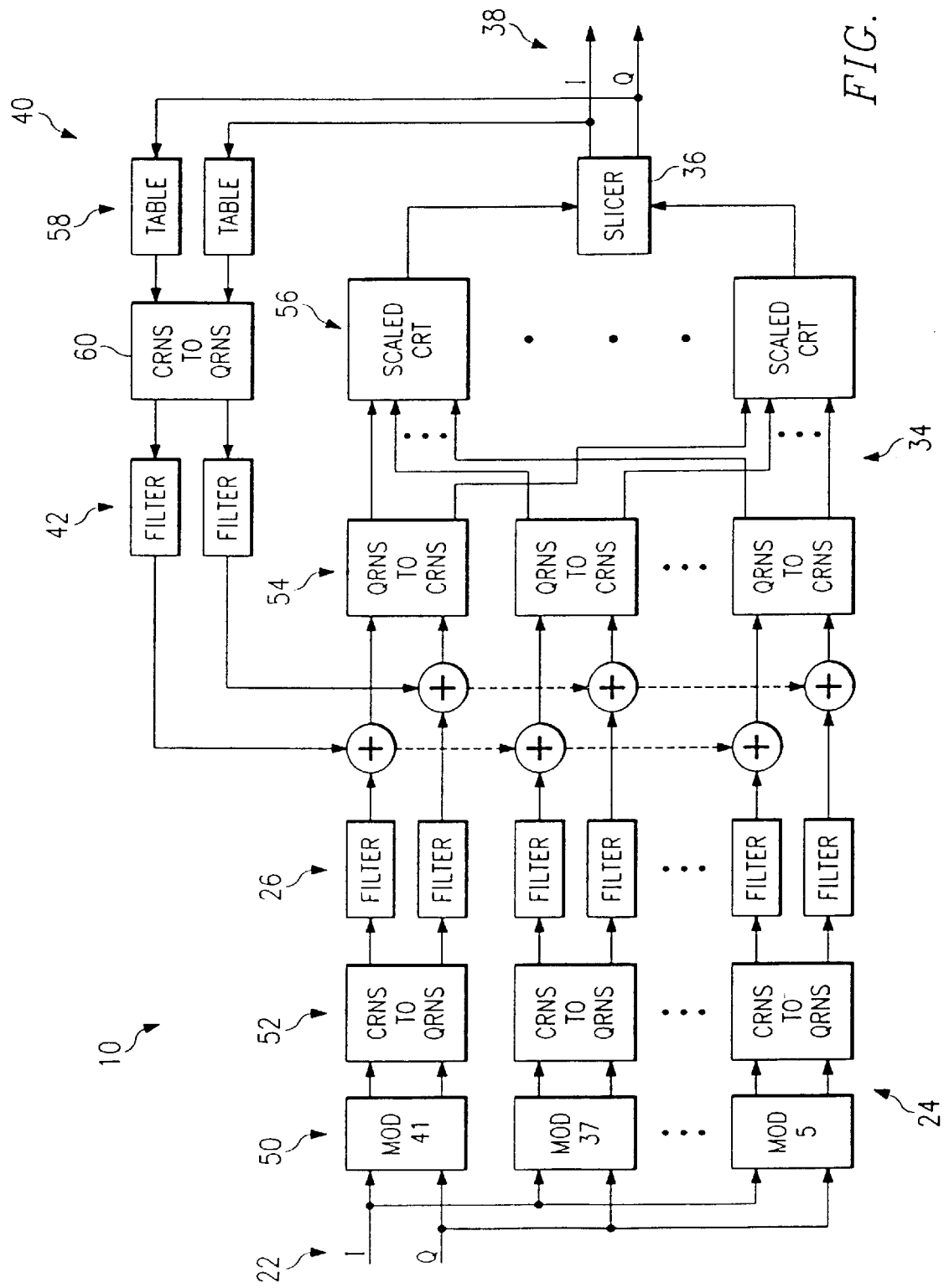
FIG. 3 is a more detailed block diagram of an embodiment of the decision feedback equalizer.

The preferred embodiment of the present invention and its advantages are best understood by referring to FIGS. 1–3 of the drawings, like numerals being used for like and corresponding parts of the various drawings.

Referring to FIG. 1, a functional block diagram of an embodiment of a parallel decision feedback equalizer 10. Parallel decision feedback equalizer 10 incorporates the residue number system (RNS) into a decision feedback equalizer structure. The parallel decision feedback equalizer 10 receives input binary data 12, and converts the input binary data into several groups of data bits based on the concept of the residue number system in a converter 14. The parsed data bits are then provided to a number of decision feedback equalizers 16 arranged in parallel which operate on the data bits. The resultant data are then converted back to the binary number system by a converter 18 and provided as the output 20. The apparatus that performs the number system conversions may be interchangeably referred to as converters and deconverters, transformers and reverse transformers, and composition and recomposition in the following description.

As early as the first century A.D., Chinese scholar Sun-Tsu wrote about a number having the remainders 2, 3, and 2 when divided by the numbers 3, 5, and 7, respectively. This notion has become known today as multiple-moduli residue number system. In residue number system, arithmetic operations such as add, subtraction, and multiplication are performed without carry-overs. Therefore using residue number system, a sequence of binary numbers can be parsed into several rings each with less number of bits. Each ring may independently perform the adaptive filtering operation in parallel, which results in faster overall system throughput.

A digital video delivery system may use modulation schemes such as quadrature amplitude modulation (QAM). To accommodate the use of quadrature amplitude modulation, complex residue number system (CRNS) is employed in the decision feedback equalizer. Let Z be a complex modulo M number defined as:

$$Z = X + jY \text{ where } j = \sqrt{-1} \quad (1)$$

where both X and Y are modulo M numbers. Basic complex residue number system arithmetic operations are as follows:
Addition:

$$Z_1 + Z_2 = Z_3 \quad (2)$$
$$= X_3 + jY_3$$
$$= [(X_1 + X_2) \bmod M] + j[(Y_1 + Y_2) \bmod M]$$

Multiplication:

$$Z_3 = Z_1 \cdot Z_2 \quad (3)$$
$$= X_3 + jY_3$$
$$= [(X_1 X_2 - Y_1 Y_2) \bmod M] + j[(X_1 Y_2 + X_2 Y_1) \bmod M]$$

It can be seen from the foregoing that one tap of a complex filter requires four real residue number system multiplications and two real additions. In a system with four complex residue number system rings, sixteen different multipliers are required for each tap.

An alternative to the residue number system is the quadratic residue number system (QRNS). For example, if the modulo M is prime and of the form M=4n+1, then it is defined:

$$\bar{j}^2 = -1 \bmod M, \quad (4)$$

where are the square root of $\bar{j}^2$ are called quadratic and −1 is a quadratic residue. It may be seen that the square root of equation (4) is a real integer. An isomorphic mapping between the complex ring complex residue number system and the quadratic residue number system is possible. The quadratic residue number system number pair (Z,Z*) and complex residue number system number X+jY can be exchanged by the following formula:

$$Z = (X + \bar{j}Y) \bmod M$$
$$Z^* = (X - \bar{j}Y) \bmod M \quad (5)$$

$$X = (2^{-1}(Z + Z^*)) \bmod M$$
$$Y = (2^{-1}\bar{j}^{-1}(Z - Z^*)) \bmod M$$

where the existence of the inverse $\bar{j}$ and $2^{-1}$ are guaranteed. If $z_1 = (Z_1, Z_1^*)$ and $z_2 = (Z_2, Z_2^*)$, the arithmetic operations of addition and multiplication can be performed as:

$$z_1 + z_2 = ([Z_1 + Z_2] \bmod M, [Z_1^* + Z_2^*] \bmod M) \quad (6)$$

$$z_1 \cdot z_2 = (Z_1 \cdot Z_2 \bmod M, Z_1^* \cdot Z_2^* \bmod M).$$

While quadratic residue number system addition requires the same number of operations as in complex residue number system, quadratic residue number system multiplication only requires two real multiplications and no addition. This reduction in the number of required operations translates to a significant reduction in the complexity in the VLSI implementation. An additional advantage is the decoupling of the two channels since there are no cross terms, which further simplifies VLSI design and debugging. For a more detailed discussion of the residue number systems, please consult Residue Number system Arithmetic: Modern Applications in Digital Signal Processing, IEEE press, 1986, by Soderstrand et al.; and/or Chapter 9 "Finite Arithmetic Concepts" of *Handbook for Digital Signal Processing*, by Sanjit K. Mitra et al., 1993.

For the purpose of illustration, two exemplary systems constructed in accordance with the present invention are described below. The two exemplary system requirements are:

| System 1 | |
|---|---|
| Data bit width: | 10 |
| Coefficients: | 12 |
| Number of taps: | 16 |
| System 2 | |
| Data and Coefficients: | 16 |
| Number of taps: | 64 |

The eight quadratic residue number system rings of 5, 13, 17, 29, 37, 41, 53, and 61 may be used to implement the parallel decision feedback equalizer. Larger moduli may also be used, but the complexity of the resultant systems makes them less appealing. For systems requiring a larger dynamic range that cannot be attained by the 5, 13, 17, 29, 37, 41, 53, and 61 moduli, non-quadratic residue number system moduli in combination with the complex residue number system may also be implemented. Since exemplary system 1 requires 25 bits of dynamic range, and exemplary system 2 requires 37 bits of dynamic range, the eight quadratic residue number system rings are sufficient for both systems. The first six rings provide an effective binary integer processing range of approximately 25.5 bits. This may be seen from $5*13*17*29*37*41 = 2^{25.5}$ Including the last two rings, the effective binary integer processing range is approximately 37.2 bits.

Referring to FIG. 2, a simplified block diagram of a multiple ring decision feedback equalizer 10 is shown. Data input 22, shown as an in-phase portion, I, and a quadrature phase portion, Q, are provided to a number system converter or composition block 24. The converter 24 is shown functionally as a binary to complex residue number system conversion block and a complex residue number system to quadratic residue number system conversion block. The quadratic residue number system data are then provided to multiple ring adaptive filters 26. The filter outputs are then provided to add operators 30 and 32, which sums the outputs from adaptive filters 26 and feedback adaptive filters 42. The sums are provided to a recomposition block 34, which converts the data back to binary, so that a decision making or slicer block 36 may operate thereon. The output 38 therefrom are fed back to a composition block 40, converting the data to quadratic residue number system, which are then provided to multiple ring feedback adaptive filters 42. Due to the function of the slicer 36, multiple ring feedback adaptive filters 42 may have less number of rings than the adaptive filters 26 in the forward direction. For example, if six ring adaptive filters are used in the forward direction, only three rings may be needed in the feedback direction. The functional blocks are described in more detail below.

Referring to FIG. 3, a more detailed block diagram of the parallel decision feedback equalizer 10 is shown. To convert input binary data to the residue number system format in blocks 50, three pipeline stages (not shown) may be utilized to implement exemplary system 1 having a ten-bit data input. The first stage may be a logic reduction implementation of a lookup table of the five most significant bits reduced to their modulo residue, and the five least significant bits reduced to their modulo residue. These residues may then be added in two pipeline stages using a double mod adder (not shown). For exemplary system 2, the number conversion may be implemented similarly with additional pipeline stages due to the longer input data width.

The conversions from complex residue number system to and from quadratic residue number system in blocks 52, 54, and 60 may require three pipeline stages (not shown). The mathematical expressions of both transforms are given in equation (5) above. One stage is used for logic reduction of a table lookup function and other stages are for a double pipeline mod adder or subtracter. Implementation of the transform requires multiplication by a constant followed by a mod addition for the complex residue number system to quadratic residue number system conversion. The reverse transform requires addition (or subtraction) followed by mod multiplication with a constant for the quadratic residue number system to complex residue number system conversion. Since the constants for different modulo are different, the best choice of each modulo implementation should be selected specifically for the modulo. The following is a constant value Table.

| mod | j | −j | $(m_i + 1)/2$ | $j (m_i + 1)/2$ | $-j (m_i + 1)/2$ |
|---|---|---|---|---|---|
| 5  | 2  | 3  | 3  | 1  | 4  |
| 13 | 3  | 8  | 7  | 9  | 4  |
| 17 | 13 | 4  | 9  | 15 | 2  |
| 29 | 12 | 17 | 15 | 6  | 23 |
| 37 | 6  | 31 | 19 | 3  | 34 |
| 41 | 9  | 32 | 21 | 25 | 16 |
| 53 | 30 | 23 | 27 | 15 | 38 |
| 61 | 11 | 50 | 31 | 36 | 25 |

At each tap of the filters 26 and 42, a complex multiplication and addition are performed. For the quadratic residue number system format, a complex multiplication requires only two real modulo multiplication. The use of logarithms reduces the multiplication operation to an addition operation. A modulo multiplication consists of two logarithms for operands, mod addition, and the antilogarithm of the results. The logarithm and antilogarithm are implemented by logic reduction lookup tables while the mod adders may be implemented by using a single pipeline stage. Multiple ring adaptive filters 26 may be implemented with six ring filters, while adaptive filters 42 may be implemented with only three rings by making approximations in the slicer 36.

The conversion back to binary in the recomposition block 34 may incorporate what is known as the scaled Chinese Remainder Theorem (SCRT), as shown in blocks 56. The tables 58 represent the table lookup modulo conversion from binary to complex residue number system. For a more detailed discussion of the scaled Chinese Remainder Theorem, please refer to *Handbook for Digital signal Processing* by Sanjit K. Mitra et al.

A distinct advantage of the parallel decision feedback equalizer may be seen by comparing the total number of gates and gate delays against conventional systems. Most of the decision feedback equalizer operations consist of complex multiplication and addition to perform the filtering function. The following table provides the estimation of the number of gates required for a complex operation (a complex multiply and accumulate) with intermediate pipeline registers stages.

|  |  | QRNS | Conventional |
|---|---|---|---|
| System 1 | gates | 4,400 | 6,500 |
|  | delay | 6 | 21 |
| System 2 | gates | 7,000 | 1,1000 |
|  | delay | 6 | 30 |

Note that gate delay does not increase as the data width increases for the quadratic residue number system implementation. However, note that quadratic residue number system does require additional overhead for the number system conversion operations. The gate count for the number system conversion process are in the following table.

|  | Binary to QRNS | QRNS to Binary |
|---|---|---|
| System 1 | 8,000 | 20,000 |
| System 2 | 12,000 | 50,000 |

Therefore, the approximate total gate count for both implementations is:

|  | QRNS | Conventional |
|---|---|---|
| System 1 | 170,000 | 208,000 |
| System 2 | 510,000 | 1,408,000 |

Note that this advantage of residue number system implementation becomes more apparent as the number of data bits increases. Constructed in this manner, a fast parallel decision feedback equalizer using a residue number system is realized.

Although the present invention and its advantages have been described in detail, it should be understood that various changes, substitutions and alterations can be made therein without departing from the spirit and scope of the invention as defined by the appended claims.

What is claimed is:

1. A decision feedback equalizer, comprising:
   a first converter receiving binary input data and converting said binary input data to residue number data;
   a plurality of parallel decision feedback equalizers coupled to said first converter and filtering said residue number data in parallel; and a second converter coupled to said plurality of parallel decision feedback equalizers and converting the filtered residue number data to binary output data;

wherein said first converter comprises:
a binary to complex residue number system converter; and
a complex residue number system to quadratic residue number system converter coupled to said binary to complex residue number system converter.

2. A decision feedback equalizer, comprising:
a first converter receiving binary input data and converting said binary input data to residue number data;
a plurality of parallel decision feedback equalizers coupled to said first converter and filtering said residue number data in parallel; and
a second converter coupled to said plurality of parallel decision feedback equalizers and converting the filtered residue number data to binary output data;

wherein said first converter comprises:
at least one lookup table having modulo residues of said binary input data; and
at least one modulo adder adding the modulo residues of said binary input data for conversion to a complex residue number system.

3. A decision feedback equalizer, comprising:
a first converter receiving binary input data and converting said binary input data to residue number data;
a plurality of parallel decision feedback equalizers coupled to said first converter and filtering said residue number data in parallel; and
a second converter coupled to said plurality of parallel decision feedback equalizers and converting the filtered residue number data to binary output data;

wherein said first converter comprises a lookup table having modulo constants.

4. A decision feedback equalizer, comprising:
a first converter receiving binary input data and converting said binary input data to residue number data;
a plurality of parallel decision feedback equalizers coupled to said first converter and filtering said residue number data in parallel; and
a second converter coupled to said plurality of parallel decision feedback equalizers and converting the filtered residue number data to binary output data;

wherein said plurality of parallel decision feedback equalizers comprise:
multiple ring adaptive filters coupled to said first converter and generating filtered output;
multiple ring feedback adaptive filters generating a feedback output; an adder coupled to said multiple ring adaptive filters and multiple ring feedback adaptive filters, summing the filtered output and feedback output therefrom, and generating a sum;
said second converter receiving said sum and converting said sum to binary data;
a slicer coupled to said second converter and generating an equalizing approximation output therefrom; and
a feedback converter coupled to said slicer converting said equalizing approximation output to feedback residue number data, said feedback residue number data being received and filtered by said multiple ring feedback adaptive filters.

5. A decision feedback equalizer, comprising:
a first converter receiving binary input data and converting said binary input data to residue number data;
a plurality of parallel decision feedback equalizers coupled to said first converter and filtering said residue number data in parallel; and
a second converter coupled to said plurality of parallel decision feedback equalizers and converting the filtered residue number data to binary output data;

wherein said second converter comprises:
a quadratic residue number system to complex residue number system converter converting a quadratic residue number data to complex residue number data; and
a scaled Chinese Remainder Theorem converter coupled to said quadratic residue number system to complex residue number system converter and converting said complex residue number data to binary output data.

6. A decision feedback equalizer, comprising:
a first converter receiving binary input data and converting said binary input data to residue number data;
a plurality of parallel decision feedback equalizers coupled to said first converter and filtering said residue number data in parallel; and
a second converter coupled to said plurality of parallel decision feedback equalizers and converting the filtered residue number data to binary output data;

wherein said second converter comprises a lookup table having modulo constants.

7. A parallel decision feedback equalizer, comprising:
a converter receiving binary input data and converting said binary input data to quadratic residue number system data;
multiple ring adaptive filters coupled to said converter and generating filtered output;
a converter receiving said filtered output and converting said filtered output to binary data;
a slicer coupled to said converter, receiving said filtered output, and generates an equalizing approximation output;
a feedback converter coupled to said slicer converting said equalizing approximation output to feedback residue number data;
multiple ring feedback adaptive filters receiving said feedback residue number data and generating a feedback output;
an adder coupled to said multiple ring adaptive filter and multiple ring feedback adaptive filters, summing the filtered output and feedback output therefrom, and generating a sum, said sum being received by said converter for conversion to binary data.

8. The parallel decision feedback equalizer, as set forth in claim 7, wherein said multiple ring feedback adaptive filters include less number of rings than said multiple ring adaptive filters.

9. The parallel decision feedback equalizer, as set forth in claim 7, wherein the converter receiving binary input comprises modulo residue and modulo constant lookup tables for binary to quadratic residue system conversion.

* * * * *